United States Patent
Syse et al.

(10) Patent No.: US 7,766,046 B2
(45) Date of Patent: Aug. 3, 2010

(54) PLUGGING SYSTEM FOR USE DURING AN OFFSHORE PIPELINE LAYING OPERATION

(75) Inventors: Harald Syse, Røyneberg (NO); Jostein Aleksandersen, Randaberg (NO)

(73) Assignee: TDW Offshore Services AS, Stavanger (NO)

( * ) Notice: Subject to any disclaimer, the term of this patent is extended or adjusted under 35 U.S.C. 154(b) by 740 days.

(21) Appl. No.: 11/796,222

(22) Filed: Apr. 27, 2007

(65) Prior Publication Data

US 2007/0227604 A1 Oct. 4, 2007

Related U.S. Application Data

(63) Continuation-in-part of application No. 10/494,727, filed on May 26, 2004, now Pat. No. 7,210,503.

(30) Foreign Application Priority Data

Nov. 13, 2001 (NO) .................................. 20015555

(51) Int. Cl.
*F16L 55/10* (2006.01)

(52) U.S. Cl. ..................... 138/89; 138/90; 405/171; 405/169

(58) Field of Classification Search .................. 138/89, 138/90
See application file for complete search history.

(56) References Cited

U.S. PATENT DOCUMENTS

| | | | | |
|---|---|---|---|---|
| 3,561,490 A | * | 2/1971 | Little | 138/90 |
| 3,842,612 A | * | 10/1974 | Arnold | 405/173 |
| 3,890,693 A | | 6/1975 | Eagleton et al. | 405/158 X |
| 3,890,905 A | | 6/1975 | Clavin | 104/138.2 |
| 3,943,982 A | | 3/1976 | Lecordier | 138/89 |
| 3,977,201 A | | 8/1976 | Bittner | 405/170 |
| 3,978,678 A | | 9/1976 | Duncan et al. | 405/171 |
| 4,098,091 A | | 7/1978 | Desai et al. | 405/169 |
| 4,252,465 A | | 2/1981 | Broussard et al. | 405/158 |
| 4,332,277 A | * | 6/1982 | Adkins et al. | 138/89 |
| 4,342,519 A | | 8/1982 | Botrel et al. | 405/169 |
| 4,422,477 A | * | 12/1983 | Wittman et al. | 138/89 |
| 4,465,104 A | * | 8/1984 | Wittman et al. | 138/89 |
| 4,498,811 A | * | 2/1985 | Fern et al. | 405/168.1 |
| 4,991,651 A | * | 2/1991 | Campbell | 166/122 |
| 5,029,614 A | | 7/1991 | Lara et al. | 138/90 |
| 5,293,905 A | * | 3/1994 | Friedrich | 138/89 |
| 5,676,174 A | * | 10/1997 | Berneski et al. | 138/89 |
| 6,732,762 B2 | * | 5/2004 | Russell | 138/89 |
| 7,124,779 B2 | * | 10/2006 | Syse | 138/89 |

FOREIGN PATENT DOCUMENTS

FR 2468827 5/1981

OTHER PUBLICATIONS

Norwegian Patent Office, "Search Report," Norwegian Patent Office, (Apr. 9, 2008).

* cited by examiner

*Primary Examiner*—Patrick F Brinson
(74) *Attorney, Agent, or Firm*—Gable Gotwals

(57) ABSTRACT

A plug for use during a pipeline laying operation for sealing off sections of the pipeline in case of water ingress. A sealing and gripping assembly is formed of slip segments around a partially conical shaped surface, the slip segments being moved by a piston/cylinder arrangement. A valve connected to a pressure vessel actuates the piston/cylinder in response to the detection of conductivity of fluid around the plug.

9 Claims, 6 Drawing Sheets

PLUGGING SYSTEM FOR USE DURING AN OFFSHORE PIPELINE LAYING OPERATION

REFERENCE TO PENDING APPLICATIONS

This application is a continuation-in-part patent application claiming priority to U.S. patent application Ser. No. 10/494,727, filed on May 26, 2004 entitled "Method and Device For Increasing Safety During Pipelaying". This patent application will issue as U.S. Pat. No. 7,210,503 on May 1, 2007.

FIELD OF THE INVENTION

This invention relates to a device for use in laying a pipeline on the bottom of a seabed at great depths and specifically for closing the interior of the pipeline in the event leakage occurs as it is being laid to prevent the entry of sea water therein and to thereby ensure that excess weight is not transferred to the lay vessel.

BACKGROUND OF THE INVENTION

When laying pipelines on the seabed by means of a pipelay vessel where the pipeline is welded together from lengths of pipe, the pipe is normally laid in a dry state. This means that the pipe is full of air or another gas during laying.

According to known techniques of pipelaying, pipe stands are welded together to form a pipeline on the deck of the lay vessel. Alternatively, the pipe length is pre-welded and is wound onto a drum. For a so-called S-lay, the finished pipe is fed continuously over the side/stern of the ship and into the sea by means of an output ramp, a so-called stinger, which guides the pipe into the sea and ensures that the pipe does not experience too small a bending radius at the upper curve during the feeding out. Alternatively, the so-called J-lay method is used wherein the pipe is fed out vertically from the front of the vessel. Down at the seabed, the pipe assumes a new curve, the lower curve, where the bending radius is dependent on among other things depth, the weight of the pipe and the tensile force applied to the pipe by the lay vessel.

Thus during the laying, the pipe assumes the shape of an S or a J in the sea. When laying pipes at great depths, the mass of the section of the pipe located between the lay vessel and the seabed represents a considerable weight. By filling the pipe with gas, the buoyancy of the pipe helps relieve the lay vessel of the weight of the pipe. This makes it possible to use a lay vessel of a considerably smaller size than that which would be required if the pipe were to be full of liquid during the laying operation.

The greatest stresses experienced by the pipe during the laying operation are found in the bending zones immediately behind the lay vessel and down at the seabed. Instances are known where pipes have not been able to bear the stress to which they are subjected during laying, resulting in leakages. Such leakages may be due to defects in the welding or the material, or a stability problem may occur, which causes the pipe to collapse over a certain distance, creating 25 longitudinal cracks.

When a leakage occurs and the pipe fills with water, the pipe loses all or part of its buoyancy. Such leakages may have catastrophic consequences, in that the net weight of that portion of the pipe which is located in the sea between the lay vessel and the seabed exceeds the bed capacity of the lay vessel This may cause the pipe to detach from the production equipment on the lay vessel and fall down to the seabed, thus incurring further damage. It may also damage the vessel seriously. Obviously, such an unintended event or accident involves a great risk of personal injury and material damages. To secure against such an event one may use internal plugs within the pipeline to seal off the pipeline where an ingress of water occurred and prevent this water from filling the part of the pipeline suspended between the vessel and the seabed. Such plugs may be positioned close to a bend in the pipeline, close to the seabed or close to the vessel.

When water is penetrating into a gas filled pipeline, it is important to have a control system and plugs that can respond quickly and securely seal off the pipeline. Many known plugs will not react quickly enough and also possibly not give a satisfactory grip on the wall of the pipeline, and the plug may therefore slip in relation to the pipeline and therefore not seal off the pipe, which then gives an unsatisfactory security of the system. This issue has for several plug systems been solved by having two plugs connected to each other, and positioned on opposite ends of the area of the pipeline where a potential leakage may occur.

An object of the invention herein is to remedy the disadvantages of the prior art.

The object is achieved in accordance with the invention by the characteristics stated in the description below and in the appended claims.

BRIEF SUMMARY OF THE INVENTION

As mentioned above, the greatest stresses experienced by the pipe during laying are found in those portions where it experiences the greatest bending stress. These are the portions where there is a risk of leakage. By arranging an upper plug internally in the pipe immediately below the bend behind the lay vessel, referred to as the upper bend, and a lower plug immediately above the bend at the seabed, referred to as the lower bend, any inflow of water through a damaged part of the pipe can be prevented from filling a pipe section between the upper and the lower bends, hereinafter called the intermediate pipe section.

If a leakage were to occur in the upper bend, the water is prevented from penetrating into the intermediate pipe section by the upper plug being locked in the pipe and providing a seal, or alternatively being held in place by a line running between the upper plug and an attachment point in the lay vessel.

Correspondingly, if a leakage was to occur in the lower bend or in the portion of the pipe situated on the seabed, the lower plug is locked into the pipe, providing a seal, whereby water is prevented from penetrating up and into the intermediate pipe section.

The plugs may be connected to the lay vessel by means of a wire running through the pipe and from the vessel to the upper plug, and a wire running from the upper to the lower plug. During the pipelaying operation, when the pipe is being fed out continuously, the plugs are displaced in the pipe, thus maintaining their position relative to the lay vessel and relative to the upper and lower bends.

Well bore tractors of a construction that is known per se may be used to transport the plugs to their predetermined positions in the pipe.

The plug of the invention comprises both a gripping means and a sealing means achieving a secure seal between two sections of the pipeline.

The gripping means comprises elements which are moved from a retracted state out of contact with the internal wall of the pipeline to an extended state where the means are in contact with the internal wall of the pipeline thereby preventing the plug from moving relative to the pipeline. The gripping means may also comprise protrusions or a friction enhanced area to further provide good gripping between the gripping means and the internal wall of the pipeline. The gripping means comprises several slip segments arranged around the circumference of the plug. Said slip segments are wedge formed. When moved between a retracted and an extended state, they move along a partly conical shaped outer surface of the main body of the plug.

The sealing means of the plug comprises an annular shaped sealing element, arranged between two pressing surfaces which, when the plug is changed from a retracted state to an extended state, are moved toward each other and thereby press the sealing element in a radial direction into sealing contact with the inner wall of the pipeline. The sealing means and gripping means are arranged so that the sealing means are facing a high pressure side of the plug when the plug is set. Such a means of sealing and gripping gives a self-locking plug, which seals against the wall of the pipeline with a pressure dependent on the pressure difference which exists across the plug.

The sealing and gripping means are actuated from a retracted to an extended state by actuation means. These actuation means comprise a pressure operated piston/cylinder arrangement, a pressure vessel connected to the cylinder arrangement, a control valve device in the connection and a sensor connected to the control valve device.

The sensors detect conductivity of the fluid around the plug and when a given value is reached the sensors activate a valve device to release the pressurized gas within the pressure vessel into the piston/cylinder arrangement to operate the plug from a retracted to an extended state for the sealing and gripping means. Alternatively, data from the sensor is communicated to a control unit which, when a given value is reached, activates the control valve.

The plug may also be connected to a pipeline tractor for correct positioning in the pipeline relative to the vessel and seabed. Connected to the tractor unit there may be sensors sensing the angled position of the unit, thereby activating the tractor unit to position the plug correctly in the pipeline.

The plugs may also be equipped with acoustic sensors to detect ingress of water into the pipe, a sensor to detect the internal diameter of the pipe, a pressure switch and possibly a water sensor, and they may be designed to automatically or through remote control connect to the internal wall of the pipe in a locking manner if the available measurements indicate that water is flowing into the pipe.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

Figure 1:
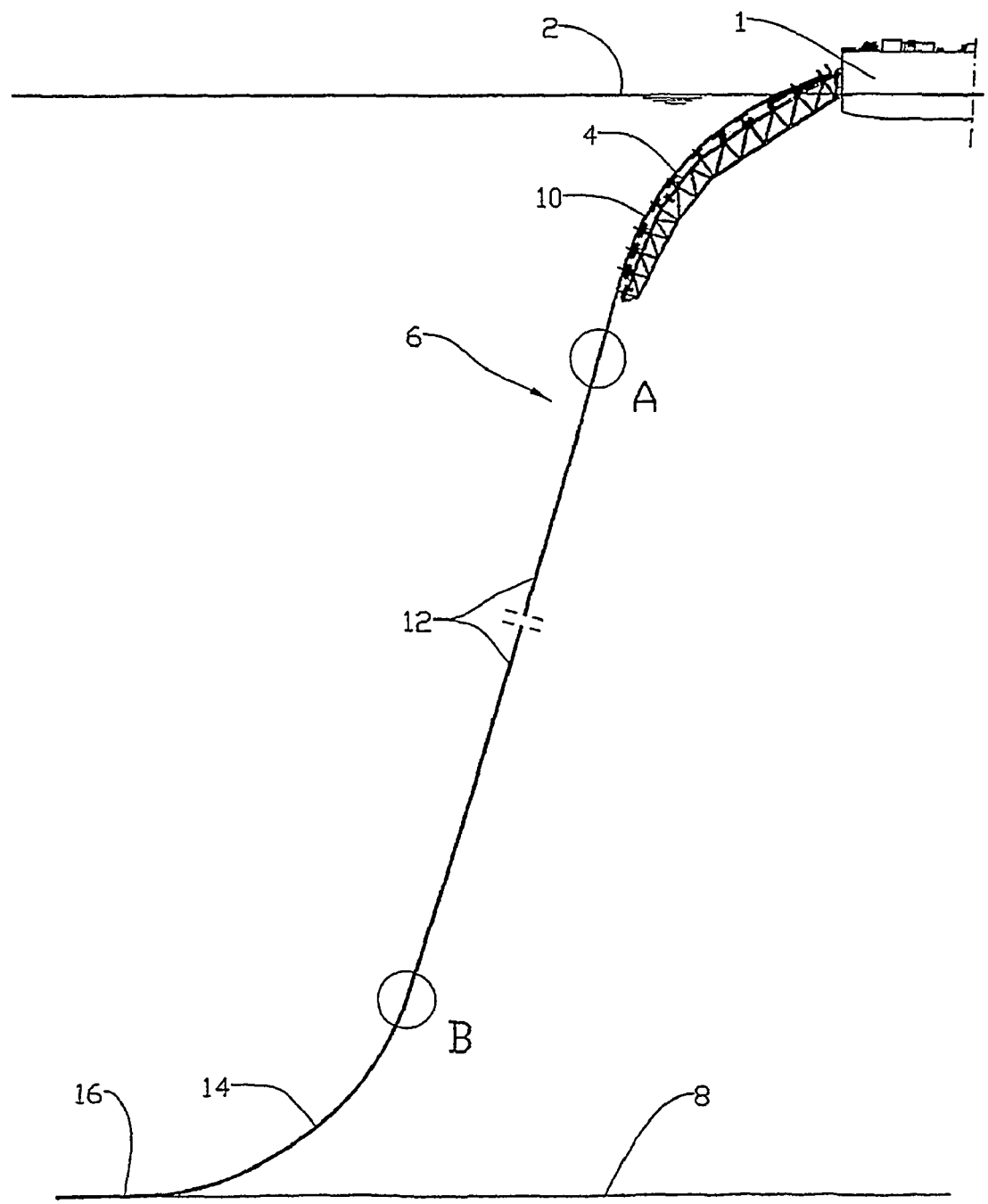
FIG. 1 shows a pipelay vessel during the laying of a pipeline, the plugs being located in the pipe at the positions marked A and B, respectively.

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

In the drawings, reference number 1 denotes a pipelay vessel on the surface of the sea 2, where the pipelay vessel 1 is equipped with a stinger 4 for laying of a pipe 6 on the seabed 8.

While being fed across the stinger 4, the pipe 6 is subjected to bending in the downward direction, thereby forming an upper bend 10. Below the upper bend 10, the pipe runs as an intermediate pipe section 12, essentially in a straight line to a lower bend 14. The lower bend 14 is formed at the transition between the intermediate pipe section 12 and the portion 16 of the pipe 6 situated on the seabed 8.

Figure 2:
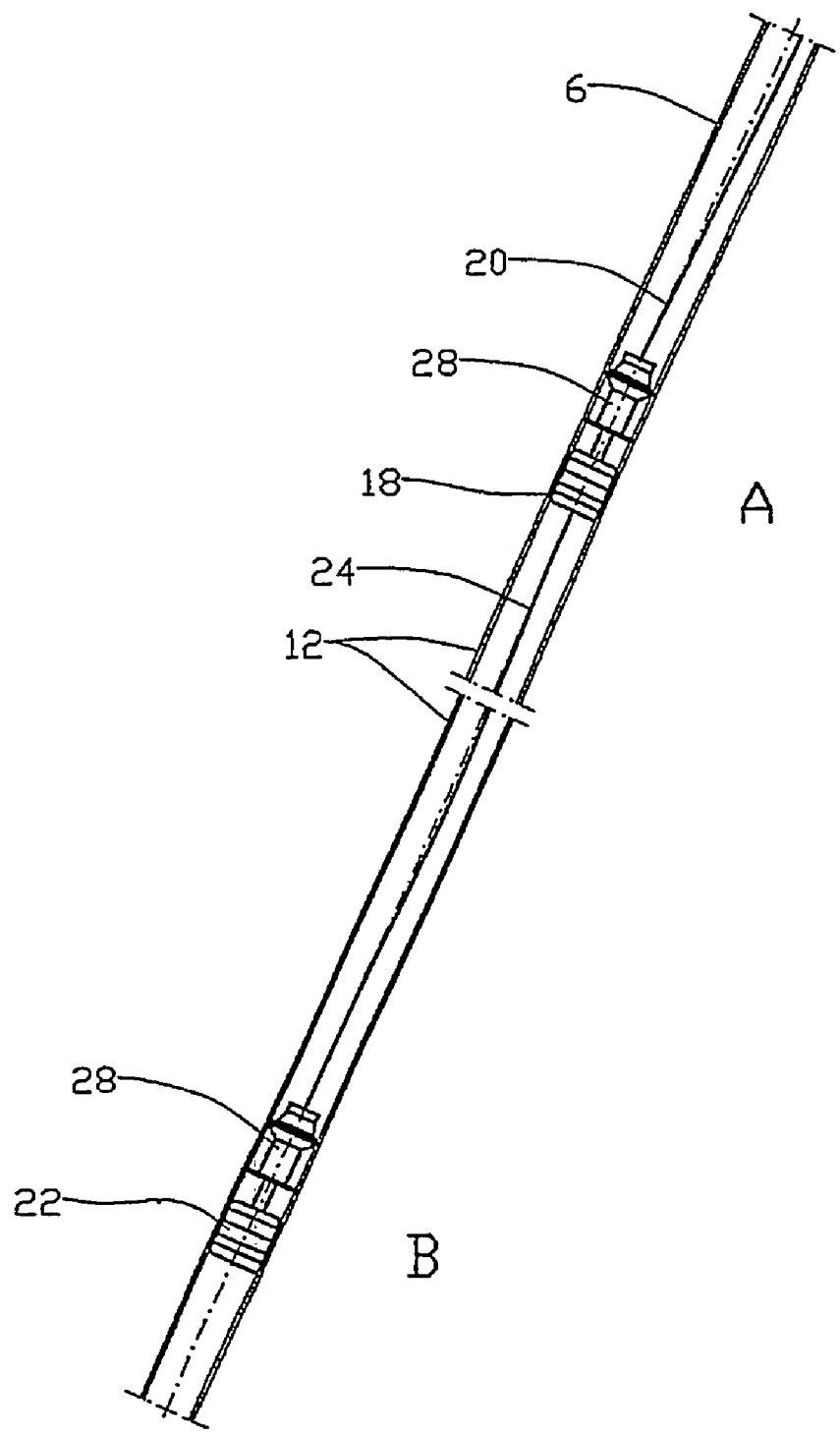
FIG. 2 shows an enlargement of a section at A and B in FIG. 1, where the plugs are arranged in the appropriate positions, and where the plugs are displaced in the pipe as the pipe is laid.

In the transition zone between the upper bend 10 and intermediate pipe section 12, a sealing, travelling and lockable upper plug 18 is arranged, connected to the structure at the lay vessel 1 by means of an upper wire 20 (See FIG. 2). Preferably, the wire 20 is equipped with cables and/or fluid conduits for the supply of energy to provide communication with the plug 18 and other plugs. Wireless communication may also be employed.

Figure 2B:
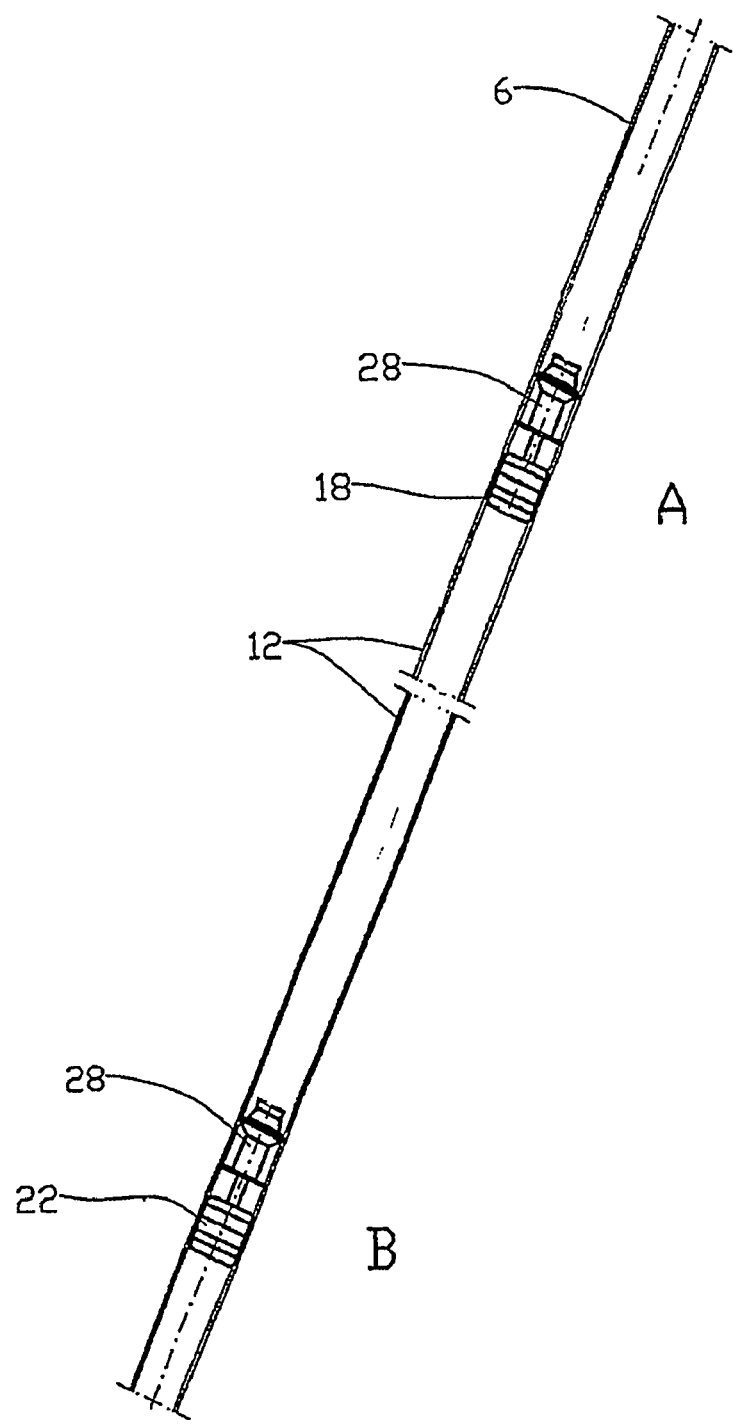
FIG. 2B shows the arrangements in FIG. 2 with autonomous plugs.

A sealing, travelling and lockable lower plug 22 is arranged inside the pipe 6 in the transition zone between the intermediate pipe section 12 and the lower bend 14. A lower wire 24, which may be the same type as the upper wire 20, runs between the upper plug 18 and the lower plug 22. In FIG. 2B there is shown a similar system with autonomous plugs, which do not need the wires 20, 24.

The plugs 18, 22 are each equipped with at least one pressure sensor (not shown) and at least one water sensor (not shown). The pressure sensors are designed to measure the ambient pressures at their respective plugs 18 and 22. A pressure increase may be an indication that water is flowing into the pipe. The water sensors detect whether there is water at the monitoring points.

The plugs 18, 22 are moved to their predetermined positions inside the pipe 6 by means of one or more well bore tractors 28 at a construction that is known per se. The wires 20, 24, which if so desired may be replaced by another type of long, load bearing element, are designed to maintain the plugs 18, 22 in a correct relative position in the pipe 6 during the laying operation. Plugs 18, 22 may also be autonomous plugs operated without a wire or cable to the vessel.

During normal operation, the plugs 18, 22 are displaced in the pipe 6 as the pipe is fed out from the lay vessel 1.

Figure 3:
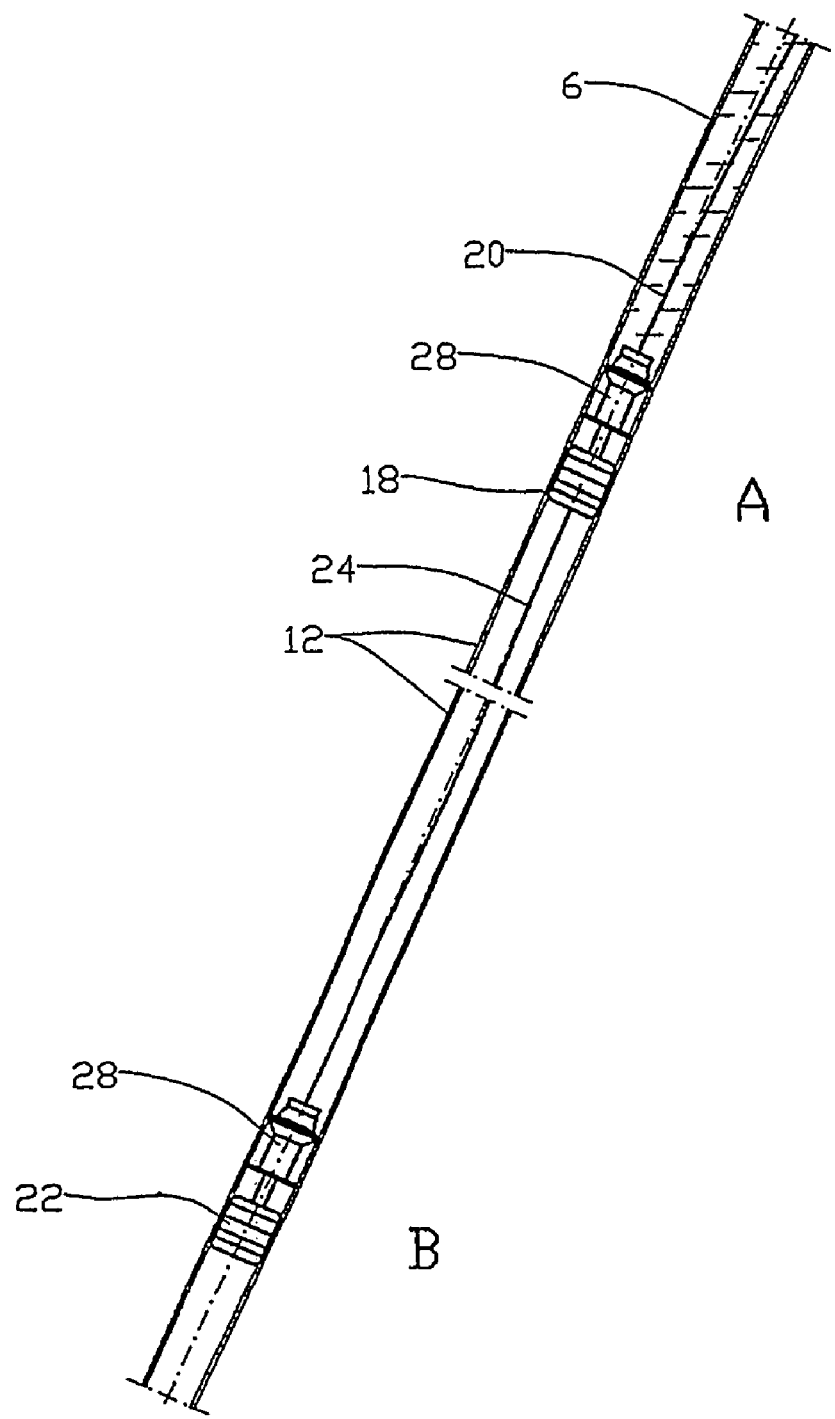
FIG. 3 shows the same as FIG. 2, but here the upper plug is locked in the pipe due to ingress of water above the plug.

In the event of a leakage occurring in the upper bend 10, water will flow down through the pipe 6 to the upper plug 18. The pressure and/or water sensor by the upper plug 18 will thereby emit a signal to the plug control system (not shown), which automatically locks the plug 18 in the pipe 6 by means of the locking means (not shown) of the plug, see FIG. 3.

Alternatively, the measurement signal can be evaluated by an operator who may carry out remote-control locking of the plug 18 in the pipe 6.

The water flowing into the upper bend 10 is thus prevented from flowing down into the intermediate section 12 of the pipe 6, whereby the intermediate pipe section 12 maintains its buoyancy. The pipe 6 may be pulled back into the lay vessel 1, where the damage can be repaired before resuming the laying.

Figure 4:
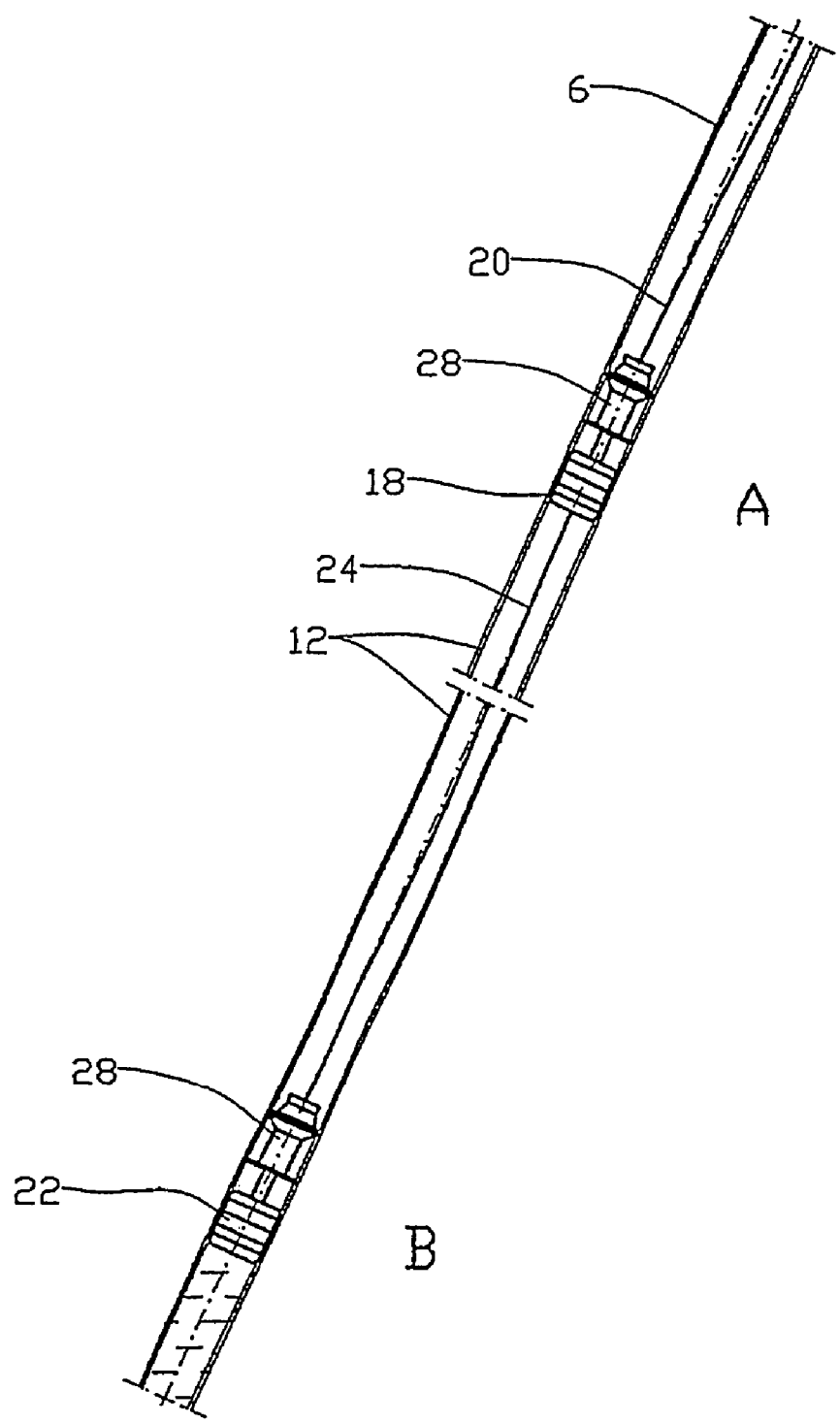
FIG. 4 shows the same as FIG. 2, but here the lower plug is locked in the pipe due to ingress of water below the plug.

Correspondingly, if a leakage were to occur in the lower bend 14 or the portion 16 of the pipe 6 situated on the seabed, water is prevented from penetrating up into the intermediate pipe section 12 by the lower plug 22 being locked in the pipe 6 (See FIG. 4). The pipe 6 may then be repaired in accordance with known procedures without causing further damage to the pipe 6 or the lay vessel 1.

In order to achieve adequate protection against the intermediate pipe section 12 being filled with water, it is necessary to use one plug at the lower end and one plug at the upper end. However, partial protection may be obtained by using only one plug.

Figure 5:
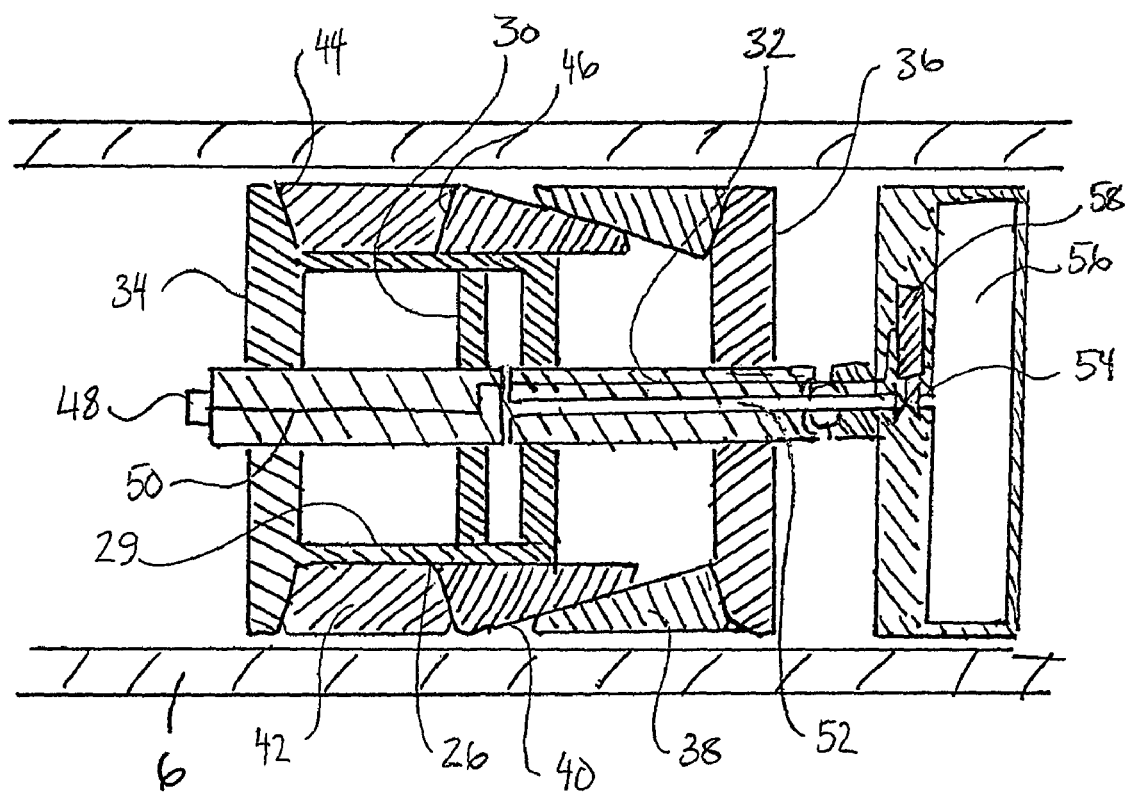
FIG. 5 shows a plug for use in a system for laying pipelines.

In FIG. 5 there is shown a plug for use when laying a pipe 6 at large water depths. The plug comprises a main plug body 26 where within there is arranged a cylinder 29, with a piston 30, dividing the cylinder 29 into two chambers. The piston 30 is connected to a through going piston rod 32, which runs through the whole plug. The plug body 26 also comprises a first end plate 34 connected to the cylinder 29 and a second end plate 36 connected to the piston 30. Around the plug body 26 there is arranged an annular sealing element 42 that may also be referred to as an annular packer element, abutting two pressing surfaces 44, 46 of the plug body 26. There are also arranged several slip segments 38 around the plug body 26. These slip segments 38 are abutting a conical outer surface 40 formed by the plug body 26. There is in the piston rod 32 arranged a fluid path 52 arranged between one of the chambers in the cylinder 29 and a pressure canister 56 for pressurized nitrogen. There is in this fluid path 52 arranged a control valve device 54 operated by a control unit 58. This control unit is in communication 50 with a sensor 48 arranged on one end of the plug.

While the invention has been described with a certain degree of particularity, it is manifest that many changes may be made in the details of construction and the arrangement of components without departing from the purpose and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. Plug for use during operations of laying a pipeline, for sealing off a pipeline in case of water ingress into the pipeline, comprising sealing and gripping means, actuation means moving the sealing and gripping means from a retracted to an extended position and a control system for operation of the actuation means, wherein the control system comprises a sensor for detecting conductivity of the fluid around the plug and a control valve device wherein the actuation means comprises a pressure vessel and a piston/cylinder arrangement for operation of the sealing and gripping means in response to a given value of fluid conductivity being reached.

2. Plug according to claim 1, wherein the gripping means comprises slip segments arranged around a partly conical shaped surface of a main body of the plug.

3. Plug according to claim 1, wherein the slip segments in an outer surface comprise a means for enhanced friction relative to an inner surface of a pipeline.

4. Plug according to claim 1, wherein the sealing means comprises an annular packer element.

5. Plug according to claim 1, wherein the pressure cylinder comprises a pressurized nitrogen gas.

6. Plug according to claim 1, wherein the piston/cylinder arrangement is positioned centrally within a main body of the plug.

7. Plug according to claim 1, wherein the plug is autonomous.

8. Plug according to claim 1, wherein it is connected to a pipeline tractor unit for positioning of the plug in the pipeline relative to the seabed and vessel.

9. Use of the plug according to claim 1, during laying of a pipeline at large water depths.

\* \* \* \* \*